United States Patent [19]

Turner

[11] Patent Number: 5,672,676
[45] Date of Patent: Sep. 30, 1997

[54] POLYESTERAMIDES WITH HIGH HEAT DEFLECTION TEMPERATURES

[75] Inventor: Sam Richard Turner, Kingsport, Tenn.

[73] Assignee: Eastman Chemical Company, Kingsport, Tenn.

[21] Appl. No.: 517,393

[22] Filed: Aug. 21, 1995

[51] Int. Cl.$^6$ ................................................. C08G 69/26
[52] U.S. Cl. ...................... 528/335; 528/272; 528/277; 528/282; 528/283; 528/285; 528/292; 528/304; 528/308.3; 528/332
[58] Field of Search ........................... 528/272, 277, 528/282, 283, 285, 292, 304, 308.3, 332, 335

[56] References Cited

U.S. PATENT DOCUMENTS 2,547,113  4/1951  Drewitt et al. .......................... 260/75

OTHER PUBLICATIONS

Thermally Stable Polymers, Synthesis and Properties, "Non-heterocyclic Polymers: Backbones Containing Carbon and Acyclic Nitrogen, Polyamides, and Others", Chapter 4, p. 67, P. E. Cassidy, Marcel Dekker, Inc., New York.

*Primary Examiner*—James J. Seidleck
*Assistant Examiner*—Duc Truong
*Attorney, Agent, or Firm*—Karen A. Harding; Harry J. Gwinnell

[57] ABSTRACT

New polyesteramides having glass transition temperatures (Tg's) of up to 130° C. and heat deflection temperatures that are in the 100° C. to 110° C. range are disclosed. The new polyesteramides of this invention are made by sequential addition of selected diamines to the diacid/glycol melt. The polyesteramides comprise:

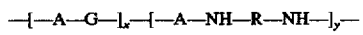

wherein A is an organic dicarboxylic acid; G is a glycol selected from linear aliphatic diols and cycloaliphatic diols having 5 to 20 carbon atoms; R is selected from alkyl, cycloalkyl, arylkyl, or aryl; and x and y are whole numbers having an x/y ratio between about 9 to about 0.5 and sum of X and Y is from about 2 to about 500.

11 Claims, No Drawings

POLYESTERAMIDES WITH HIGH HEAT DEFLECTION TEMPERATURES

BACKGROUND INFORMATION

Many applications of engineering plastics require intermediate (90°–150° C.) HDT's along with other properties such as tensile strength and chemical resistance. Conventional commercial polyesters generally are deficient in Tg and thus HDT, but possess other desired property attributes such as excellent mechanical properties, good surface finishes of molded articles and satisfactory chemical resistance. On the other hand bisphenol A polycarbonate (PC) possesses the requisite thermal properties for these applications, but is deficient in chemical resistance. Multicomponent blends and alloys using PC and various polyesters have been developed to meet the requirements for applications. However, most blends require expensive compounding steps with a concomitant sacrifice of properties. The polymers disclosed in "Thermally Stable Polymers, Synthesis and Properties" P. E. Cassidy, Marcel Dekker, Inc. New York, 1980 display very high Tg's and heat deflection temperatures, but are generally too exotic for the intermediate heat applications. Many of these materials are also produced by undesirable solution based polymerization processes.

Many polyesteramides are well known in the art. U.S. Pat. No. 2,547,113 discloses a sequential addition process for the preparation of polyesteramides based on high melting aromatic diamines, diacids and diols. However, U.S. Pat. No. 2,547,113 discloses that the high melting aromatic diamine must be added after a preliminary condensation of the lower melting constituents to get a homogeneous polymer. We are practicing a similar sequential addition process where the diamine is added after some preliminary step-growth condensation has occurred. Addition of low melting or liquid diamines, or the use of a diamine/terephthalic acid slurry was not disclosed.

DESCRIPTION OF THE INVENTION

The present invention relates to novel polyesteramides with high Tg's (about 110° to about 130° C. range) and accordingly high HDT's (about 90° to about 110° C.) and the melt process for their preparation. Incorporation of various diamines into the polymerizing melt leads to the formation of polyesteramides with significantly improved thermal properties when compared to the unmodified polyester.

The polyesters of this invention have the formula:

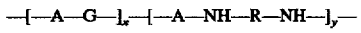

where the ratio of X to Y ranges from about 9 to about 0.5 and the sum of X and Y has a value of from 2 to about 500 or higher, more preferably from 4 to 250. A is an organic dicarboxylic acid. Suitable organic dicarboxylic acids are selected from the group consisting of aromatic dicarboxylic acids having 8 to 16 carbon atoms, aliphatic diacarboxylic acids having 3 to 12 carbon atoms and cycloaliphatic dicarboxylic acids having 8 to 12 carbon atoms. Preferably said organic acid is selected from aromatic dicarboxylic acids having 8 to 16 carbon atoms and cycloaliphatic dicarboxylic acids having 8 to 12 carbon atoms. More preferably said organic dicarboxylic acid is selected from 2,6-, 1,4-, 1,5-, 2,7-, 1,2-, 1,3-, 1,6-, 1,7, 1,8-, 2,3-, 2,4-, 2,5- and 2,8-naphthalenedicarboxylic acids, 4,4'-biphenyldicarboxylic acid, terephthalic acid, isophthalic acid, 1,4-cyclohexanedicarboxylic acid, 1,3-cyclohexanedicarboxylic acid and mixtures thereof. Preferably the organic dicarboxylic acid is terephthalic acid.

G is any glycol known to capable of forming a polyester. Suitable glycols include linear aliphatic diols and cycloaliphatic diols having 5 to 20 carbon atoms. Examples of such diols include cyclohexanedimethanol (CHDM), cyclohexanediol, decalindimethanol and mixtures thereof. Preferably the glycol is a cycloaliphatic diol, and most preferably is CHDM. The CHDM used may be either the cis or trans isomer, or mixtures thereof. A ratio of about 30/about 70 cis/trans is readily available.

R is the moiety from the diamine reactant. In the above formula R represents the connecting structure for the reactive primary diamino functional groups. R can be alkylene, cycloalkylene, arylalkylene, or arylene. Preferably R is an alkylene having 2 to 6 carbon atoms, cycloalkylene having 6 to 14 carbon atoms or an arylalkylene having 6 to 16 carbon atoms. More preferably the diamine is selected from hexamethylenediamine (HMDA), butanediamine (BD), ethylenediamine (ED), 1,4 and 1,3-cyclohexanediamine (CD), 1,4 and 1,3-cyclohexane-bismethylamine (CHBMA), methylenebisaniline (MDA), 1,3 and 1,4-xylylenediamine (XDA) and bis(p-amino-cyclohexyl)methane (BACHM). Other reactive diamines can be likewise incorporated into the polyesteramides of this invention.

Subscripts x and y are whole numbers selected such that the ratio of x to y ranges from about 9 to about 0.5 and the sum of x and y has a value of from about 2 to about 500 or higher, more preferably from about 4 to about 250.

The polyesteramides of the present invention are prepared via the sequential addition of the diamine or a mixture of the diamine and acid to a condensing melt mixture of acid and glycol. These kind of melt processes are well known to those skilled in the art and consist of several steps. The first reaction step is generally done under a nitrogen sweep with efficient stirring and the reactants may be heated slowly or quickly. The reaction temperature is important but not critical to the polymerization. Appropriate reaction conditions for a variety of acid-glycol polymerizations are known in the art. Any polymerization temperature which affords a clear melt under sequential addition conditions and affords a reasonable rate of polymerization without an unwanted amount of side reaction and degradation may be used. When terephthalic acid and CHDM are used a temperature between about 240° C. and about 350° C., and more commonly between about 260° C. and about 310° C. are used.

The reaction is maintained in this stage for 0.5 to 3 hours with the condensation reaction of amidation and esterification taking place. The next step is to take the reaction under vacuum (0.1 Torr) where the condensation reaction builds the polymer to the desired molecular weight. The polymer is recovered in the last step by either cooling and isolating the polymer and grinding or by extruding the hot polymer melt, cooling and pelletizing.

The ratio of reactants in these melt polymerizations is important and an excess of CHDM is required for the best results. For example, when the glycol component is CHDM and the acid component is terephthalic acid the ratio of glycol to acid is generally between about 10 to about 1.1, preferably between about 5 to about 1.2 and most preferable between about 3 to about 1.8. The remainder of the desired stoichiometric charge of TPA may be added with the desired amount of diamine as a free flowing slurry. Alternatively, a stoichiometric amount of the TPA may be added initially followed by the diamine, which is added sequentially after an initial condensation stage.

Catalysts are not critical and the polymerizations of the present invention may be conducted in the absence of catalysts. Examples of suitable catalysts include, but are not limited to those based on metal salts and chelates of Ti, Zn, Ge, Ga, Sn, Ca, Li and Sb. Other known polyester catalysts may also be used for this step-growth polymerization. The catalyst level is not critical and is dependent on the catalyst that is used. Generally the catalyst is used in concentration ranges of about 10 to about 500 ppm, preferably about 20 to about 300 ppm and most preferably about 30 to about 250 ppm.

The polyesteramides of this invention are useful in a variety of engineering plastics applications such as automotive and recreational and utility vehicle parts where heat resistance, chemical resistance, and good mechanical properties are important.

EXAMPLE 1

A polyesteramide based on terephthalic acid (TPA), cyclohexanedimethanol (CHDM—30/70 cis/trans), and 30 mol % of cyclohexanedimethanolamine (CHBMA) was prepared by charging a polymerization reactor with TPA (58.1 g, 0.35 mol), CHDM (108 g, 0.75 mol) and 100 ppm Ti catalyst as Ti (OAc)$_4$. The mixture was placed into a 300° C. metal bath and at 30 min intervals a slurry of 8.3 g (0.05 mol) TPA and 7.2 g (0.05 mol) CHMBA were added. This was done three times to result in a total amine charge of 21.6 g (0.15 mol) and a total TPA charge of 0.5 mol (83 g). The polymerization temperature was raised to 305° C. and held for 40 minutes and then brought under vacuum (0.10 Torr) and the clear melt was at vacuum for about 10 min. A very light yellow amorphous polymer with and inherent viscosity of 0.8 was obtained. The Tg on the second scan in a DSC instrument was 125° C. Molecular weight determination by size exclusion chromatography showed Mn=17,500; Mw=89,100 and MWD=5.09.

COMPARATIVE EXAMPLE

A polyesteramide based on terephthalic acid (TPA), cyclohexandimethanol (CHDM) and 30 mol % cyclohexanedimthanolamine (CHMBA) was prepared by charging a polymerization reactor with the reactants described in Example 1 such that all of the reactants, including the CHBMA and TPA were added in the initial reactor charge. The white slurry, cement looking reaction mixture did not melt clear even after 2.5 hours at 315° C. under vacuum. The resulting off-white colored solid had an IV of only 0.4 and a second cycle Tg of 110° C.

The materials formed by sequential addition in Example 1 had an IV of 0.8 and a Tg of 125° C. Thus, even though the same starting materials, in the same proportions were used in both examples the polyesteramides of the present invention display surprisingly higher Tg's (15° C. higher) and IV's (twice as high) as those prepared by simultaneous addition. This result was totally unexpected.

EXAMPLES 2–5

Polyesteramides based on TPA, CHDM, and 30 mol % of the diamines listed in Table 1 were prepared in a procedure similar to Example 1. The time the slurry was held at vacuum, IV, Tg, and molecular weight by size exclusion chromatography are also listed. It should be understood that each of the entries in Table 1, below, is prefaced by the word "about."

TABLE 1

| Ex # | diamine | hold time (min) | IV | Tg (°C.) | Mn | Mw | MWD |
|---|---|---|---|---|---|---|---|
| 2 | BACHM | 15 | 0.55 | 127 | 11,300 | 21,600 | 1.90 |
| 3 | DCH | 20 | 0.58 | 120 | 12,900 | 33,300 | 2.57 |
| 4 | BAC | 10 | 0.62 | 118 | 17,000 | 95,800 | 5.63 |
| 5 | mXDA | 15 | 0.50 | 103 | 10,700 | 29,100 | 2.72 |

BACHM = bis(p-aminocyclohexyl)methane
DCH = 1,4-diaminocylclohexane
BAC = 1,3-bis(aminomethyl)cyclohexane
mXDA = m - xylylenediamine (mXDA)

Thus all of the diamines used produced modified polyesters displaying enhanced glass transition temperatures in the same range as the modified polyester of Example 1.

EXAMPLE 6

A polyesteramide with 50 mol % of m-XDA was prepared by a slurry addition as in Example 5 but with the stoichiometry adjusted for this composition. The resulting yellowish amorphous polymer had an Mn=10,100; Mw=66,000 and MWD=6.52. The Tg on the second DSC scan was 126° C. Thus, the incorporation of m-XDA into the polyesteramide also yields the desired high Tg.

EXAMPLE 7

A polyesteramide was prepared as in Example 1 except that all of the TPA was charged in the beginning and only the CHBMA was added sequentially in three equal portions over a 90 minute period. A clear melt was given a 45 min vacuum stage. After cooling a white crystalline polymer was obtained with an inherent viscosity of 0.62 and a second cycle Tg of 132° C. Molecular weight determination by size exclusion chromatography showed Mn=11,600; Mw=23,800 and MWD=2.05.

EXAMPLES 8–11

Table 2, below, shows the HDT and mechanical properties for polyesteramides as prepared in Examples 1 and 2. For comparison purposes similar data from a 50/50 blend of poly(cyclohexanedimethylterephthalate) (PCT) and bisphenol A polycarbonate (PC) and a poly(cyclohexanedimethyl-co-ethyleneterephthalate) (PCET) are included.

TABLE 2

| Ex # | polymer | HDT (66 psi) | HDT (264 psi) |
|---|---|---|---|
| 8 | PEA of Ex 1 | 109 | 91 |
| 9 | PEA of Ex 2 | 106 | 85 |
| 10 | PCT/PC | 104 | 91 |
| 11 | PCET | ** | 66 |

**not measured

Table 2, Examples 8–11, shows HDT for TPA-CHDM polyesteramides with 30 mol % of BACHM and CHBMA respectively. The HDT's for these compositions are considerably elevated (19°–26° C. higher) over a conventional polyester based on TPA, CHDM and ethylene glycol (PCET) and is equivalent to TPA-CHDM polyester blended 50:50 with bisphenol A polycarbonate (a commercial high HDT polymer). It was very unexpected to get HDT's which are comparable to those achieved upon the addition of polycarbonate without having to add an additional component to the polymer.

We claim:
1. Polyesteramides comprising:

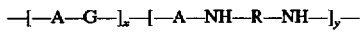

wherein A is an organic dicarboxylic acid; G is a glycol selected from linear aliphatic diols and cycloaliphatic diols having 5 to 20 carbon atoms; R is selected from alkyl, cycloalkyl, arylkyl or aryl NH—R—NH is derived from a low melting diamine; and x and y are whole numbers having an x/y ratio between about 9 to about 0.5 and sum of X and Y is from about 2 to about 500.

2. The polyesteramide of claim 1 wherein said organic dicarboxylic acids are selected from the group consisting of aromatic dicarboxylic acids having 8 to 16 carbon atoms, aliphatic diacarboxylic acids having 3 to 12 carbon atoms and cycloaliphatic dicarboxylic acids having 8 to 12 carbon atoms.

3. The polyesteramide of claim 1 wherein said organic dicarboxylic acids are selected from the group consisting of aromatic dicarboxylic acids having 8 to 16 carbon atoms and cycloaliphatic dicarboxylic acids having 8 to 12 carbon atoms.

4. The polyesteramide of claim 2 wherein said organic dicarboxylic acid is selected from the group consisting of 2,6-, 1,4-, 1,5-, 2,7-, 1,2-, 1,3-, 1,6-, 1,7, 1,8-, 2,3-, 2,4-, 2,5- and 2,8-naphthalenedicarboxylic acid, 4,4'-biphenyldicarboxylic acid, terephthalic acid, isophthalic acid, 1,4-cyclohexanedicarboxylic acid, 1,3-cyclohexanedicarboxylic acid and mixtures thereof.

5. The polyesteramide of claim 1 wherein said organic dicarboxylic acid is terephthalic acid.

6. The polyesteramide of claim 1 wherein said diol is selected from the group cyclohexanedimethanol (CHDM), cyclohexanediol, decalindimethanol and mixtures thereof.

7. The polyesteramide of claim 1 wherein said glycol is a cycloaliphatic diol.

8. The polyesteramide claim 7 wherein said glycol is CHDM.

9. The polyesteramide of claim 1 wherein R is selected from the group consisting of alkylene having 2 to 6 carbon atoms, cycloalkylene having 6 to 14 carbon atoms or an arylalkylene having 6 to 16 carbon atoms.

10. The polyesteramide of claim 1 wherein R is selected from hexylene, butylene, ethylene, 1,4-cyclohexylene, 1,3-cyclohexylene, 1,4-cyclohexanebismethylene, 1,3-cyclohexanebismethylene, bis(phenyl)methylene, 1,3-xylylene, 1,4-xylylene, bis(cyclohexyl)methylene and mixtures thereof.

11. The polyesteramide of claim 1 wherein said sum of x and y is between about 4 and about 250.

* * * * *